United States Patent [19]

Mansukhani

[11] 4,266,229
[45] May 5, 1981

[54] LIGHT SENSITIVE JET INKS
[75] Inventor: Ishwar R. Mansukhani, Neenah, Wis.
[73] Assignee: Whittaker Corporation, Los Angeles, Calif.
[21] Appl. No.: 24,116
[22] Filed: Mar. 26, 1979
[51] Int. Cl.³ .............................................. G01D 15/18
[52] U.S. Cl. ........................................ 346/1.1; 346/75
[58] Field of Search .......................... 346/1, 75, 140 R

[56] References Cited
U.S. PATENT DOCUMENTS 3,982,251  9/1976  Hochberg .................... 346/140 R X
4,095,233  6/1978  Goffe ...................................... 346/75

*Primary Examiner*—George H. Miller, Jr.
*Attorney, Agent, or Firm*—Henry M. Bissell

[57] ABSTRACT

Ink compositions suitable for ink jet printing on metal, plastic, or paper surfaces, the ink characterized by light fast properties, incorporating in solution, silver nitrate and at least one solvent, said inks are subsequently exposed to ordinary light so as to render them particularly as a means for marking various materials whereby marking is normally visible.

5 Claims, No Drawings

LIGHT SENSITIVE JET INKS

BACKGROUND OF THE INVENTION

This invention relates to inks characterized by light sensitive properties. More specifically, this invention relates to inks light-fast in ordinary light so as to render them particularly suitable as a means for marking various materials. Ink jet printing is a recent development in the art of applying identifying and decorative indicia to a base. In general terms, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to impinge to the base medium which is to receive the decorative or informative period indicia. Apparatus suitable for carrying out the ink jet printing process is described in detail in U.S. Pat. Nos. 3,465,350 and 3,465,351, issued Sept. 2, 1969 and it is in connection with an apparatus and process such as are described in the aforementioned patents that the ink of the present invention is designed to function.

In order to operate satisfactorily in an ink jet printing system, an ink must display a consistent drop breakup length, drop velocity and drop charge under set operating conditions.

It has been determined that on ink jet printer, described in U.S. Pat. Nos. 3,465,350 and 3,465,351, inks with viscosity of 25 cps. will perform satisfactorily depending upon the type of nozzle used. However, inks with lower viscosities perform much better. Resistivity of ink may range as high as 10,000 ohm cm. for satisfactory operations.

DESCRIPTION OF THE INVENTION

This invention is a process for information recording comprising producing a fine jet of aqueous liquid, containing a silver salt, directing said jet of liquid onto a recording medium while modulating the density of the applied jet by an electric field in accordance with the information to be recorded, thereby recording said information, thereafter subjecting said recorded information to light, thereby rendering it visible.

Inks of this invention include two basic components. The first is a silver compound for providing visibility of the printed indicia upon exposure to light. The second major component is the solvent which provides fluidity to the ink and carries the silver compound in solution.

This invention, thus, relates to inks which precipitate silver upon reduction.

Solvents include aliphatic alcohol and other solvents can be ketones, aldehydes, ethers, esters, glycols, glycol ethers, hydrocarbon, lactones. Typical aliphatic monovalent alcohols are methyl alcohol, ethyl alcohol, n-propyl alcohol, isopropyl alcohol, n-butyl alcohol, sec-butyl alcohol, tert-butyl alcohol, isobutyl alcohol, n-amyl alcohol, amyl alcohol, isoamyl alcohol, hexyl alcohol, heptyl alcohol, octyl alcohol, or a mixture of same. Aliphatic monovalent alcohols with 1 to 8 carbon atoms are particularly preferred.

Other solvents for these inks are ketones, aldehydes, ethers, esters, hydrocarbons, glycol, glycol ethers and lactones.

Suitable solvents are hydrocarbons, such as hexane, heptane, octane, decane, cyclopentane, cyclohexane, benzene, toluol, xylol, and ethylbenzene; hydrocarbon halides, such as carbon tetrachloride, ethylene dichloride, trichloroethylene, tetrachloroethane, and dichlorobenzene; ether-type solvents, such as butyl ether, ethylene glycol-diethyl ether, ethylene glycol-monoethyl ether, ethylene glycol-monobutyl ether; ketone-type solvents, such as acetone, methylethyl ketone, methyl propyl ketone, methyl isobutyl ketone, methylamyl ketone, cyclohexanone; ester-type solvents, such as ethyl formate, methyl acetate, propyl acetate, butyl acetate, phenyl acetate, ethylene glycol-monoethyl ether acetate, methylpropionate; other alcohol solvents, such as diacetone alcohol or such.

While there is disclosed below but one embodiment of the invention herein presented, it is possible to produce still other embodiments without departing from the invention concepts herein disclosed. Various other modifications will be readily apparent to those skilled in the art.

| Example 1 | Parts by Weight |
| --- | --- |
| $AgNO_3$ | 5.00 |
| $HNO_3$ | 1.00 |
| Water | 40.00 |
| Methanol | 54.00 |
| | 100.00 |

Various other examples and modifications of the ink compositions of this invention might be cited or will suggest themselves to those skilled in the art, and it is intended that the scope of the invention be limited only as necessitated by the appended claims.

What is claimed is:

1. A process for information recording comprising producing a fine jet of colorless liquid containing at least one silver salt, modulating the charge density of the jet by applying an electric field in accordance with the information to be recorded, directing the jet of liquid to a recording medium to record said information, and subsequently exposing said recorded information to ordinary light, thereby rendering said recorded information visible.

2. The process of claim 1 wherein said silver salt is in solution and is subsequently chemically reduced by said light.

3. The process of claim 1 wherein the liquid exhibits a viscosity of up to 25 cps. and a resistivity of under 10,000 ohm-cm.

4. The process of claim 3 wherein the liquid includes a solvent selected from the group consisting of aliphatic monovalent alcohols having from 1 to 8 carbon atoms and mixtures thereof.

5. The process of claim 4 wherein said silver salt is silver nitrate.

* * * * *